Sept. 17, 1963   J. DE KONING   3,104,038
DISCHARGING DEVICE FOR A BUNKER
Filed Feb. 13, 1961   2 Sheets-Sheet 1

INVENTOR
JACOB DE KONING

BY Cushman, Darby & Cushman
ATTORNEYS

Sept. 17, 1963 J. DE KONING 3,104,038
DISCHARGING DEVICE FOR A BUNKER
Filed Feb. 13, 1961 2 Sheets-Sheet 2

INVENTOR
JACOB DE KONING
BY Cushman, Darby & Cushman
ATTORNEYS

United States Patent Office 3,104,038
Patented Sept. 17, 1963

3,104,038
DISCHARGING DEVICE FOR A BUNKER
Jacob de Koning, Gleen, Netherlands, assignor to Stamicarbon N.V., Heerlen, Netherlands
Filed Feb. 13, 1961, Ser. No. 88,915
Claims priority, application Netherlands Feb. 15, 1960
4 Claims. (Cl. 222—409)

The present invention relates to a new and improved discharging device for a bunker. In the prior art structures of this character, discharging devices have been provided consisting of a displaceable plate operatively mounted to a bunker opening on which plate the material contained in the bunker rests with its natural slope, with means being provided for imparting a reciprocating movement to the plate. In such prior art devices, the plate is horizontally mounted on a number of rollers, and when the plate is moved away from the bunker opening, a layer of material resting on the plate is carried along. This layer, during the return movement of the plate, is then pushed over the edge of the plate onto a conveyor or the like, by virtue of the material sinking from the bunker onto the plate.

These prior art discharging means for bunkers have been constructed to discharge on one side or on both sides; and in addition, mechanisms are provided for imparting a regular periodic reciprocal movement to the plate. Bunkers provided with such discharging devices are used when a product of mean composition must be continually conveyed from a number of bunkers to a certain point for treatment, for example, conveying coal or ore to a washer or to a similar separator. In this manner, streams of material can be simultaneously extracted from a number of bunkers, and the blending ratio may be altered by adjustment of the amplitude and frequency of the stroke of the discharging device.

Such prior art bunker discharging devices have a certain shortcoming in that only during the return stroke of the plate towards the bunker opening is the material discharged over the edge of the plate. Thus, there is provided an intermittent supply of material from the discharge end of the plate to the belt conveyor. Also, such prior art bunker discharging devices are of relatively complex construction, having a number of moving parts such as rollers, which require considerable maintenance and attention.

In the German Patent No. 855,978, there is provided a discharging device for a bunker consisting of a substantially cylindrical plate mounted some distance below the bunker outlet with its convex surface facing the outlet. This device is operably mounted for rotating movement on a horizontal shaft mounted on the concave surface of the plate and positioned immediately under this plate. In this device, the material lies on the plate when in the position of rest, forming a natural slope on either side of the bunker outlet. As the plate is swung on the shaft, a portion of the material will slide onto the descending half and drop off the plate. The material on the opposite part of the plate, however, even including the portion directly under the bunker outlet, will be raised, for which purpose extra energy input is required.

It is accordingly an object of the present invention to provide a discharging means for a bunker or the like which overcomes the shortcomings of the prior art bunker discharging devices of the character described.

Another object of this invention is to provide a discharging device for a bunker wherein the shaft of rotation of a cylindrical discharge plate is positioned to coincide with the axis of the arc thereof.

Another object of the present invention is to provide a discharging device for a bunker or the like wherein a more continuous supply of material is passed from the bunker to the conveyor than heretofore available. To this end, when the discharge plate is rotated out of its neutral position, a layer of material will be carried along and, if the angle formed by the original slope of the material and the horizontal plane is increased during this movement, part of the material will slide down along the plate during this movement, and the remainder of the material on the plate will be pushed off the plate during the return stroke.

Still a further object of this invention is to provide a discharging device for bunkers having lateral or vertical discharge openings; and, in the latter type of bunkers, the opening is preferably in the form of a rectangle spaced in a horizontal plane with the axis of rotation of the discharge plate located in a vertical plane of symmetry of the bunker discharge opening.

Another object of this invention is to provide a bunker discharging device with the means for enhancing the discharge of the material when the bunker is almost empty wherein the material can be more easily returned. In this regard, there is provided a vertical member mounted across the bunker opening of the cylindrical curved discharge plate, this member preferably being disposed perpendicular to the direction of movement of the material.

A further object of this invention is to provide a curved discharge plate for a bunker wherein the ratio between the arc length of the plate and the arc length of the angle to be traversed by the plate is such that the plate, while in its neutral position extends beyond the bottom of the natural slope of the material on the plate over a distance close to at least half of the arc length of the angle traversed by the plate.

A still further object of this invention is to provide a bunker discharge device that allows for a bunker installation which may be erected a relatively short height from the ground or the like. To this end, there is provided a curved discharge plate which, during the reciprocating movement between the vertical planes through the lower edges of the bunker walls on either side of the plane of symmetry through the shaft of rotation is a constant radius; while extensions thereof have a larger radius, or a gradually increasing radius, smoothly extending from both sides thereof. By preference, one of the radii of the extension adjoining the center portion of the plate is infinite, and thereby the extension being a flat plane. As a result of this measure, the discharging plate, whilst being displaced under the material enclosed by the vertical planes delimiting the bunker discharge opening, where it is subjected to the full pressure of the column of material in the bunker, needs only overcome the frictional resistance, whereas the extensions of the discharge plate adjoining the central portion need only lift the sloping portions of the material through only a very small distance, wherefore relatively little energy is required. In this regard, an additional advantage is provided if the material is supplied more regularly than would be the case if the whole plate should have a larger radius.

Still further objects and advantages of the present invention will become apparent in the specification, claims and accompanying drawings wherein:

Reference is now made to the accompanying drawings wherein like numerals refer to similar elements.

Figure 1:
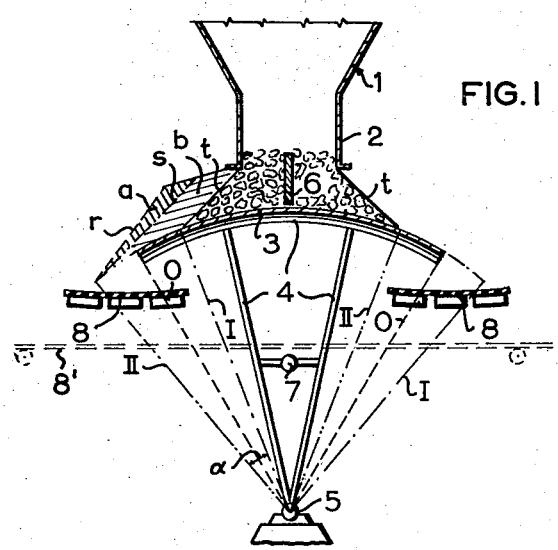
FIGURE 1 is an elevation section view of an embodiment of the bunker discharging means according to the invention.

In FIGURE 1 there is shown a bunker 1 which is provided with vertical bunker discharge walls 2. Disposed beneath the bottom end of the bunker discharge walls 2 is a cylindrically curved plate 3 which is mounted with its convex side upwards to frame members 4 which, in turn, are secured at their lower ends to a shaft 5, coinciding with the mathematical axis of the cylinder arc of the plate.

This shaft 5 is preferably mounted on a so-called "silent block" (not shown) of known construction and may include, for example, two concentric steel bushings with a rubber filling clamped in the space between the bushings; or, vulcanized to the outer wall of the inner bushing, or vice versa. The outer or inner bushing is then fitted to a fixed support, and the other to a driving means (not shown). The rubber cushion provides the reciprocating angular displacement of the shaft 5 without requiring lubrication of the above-mentioned parts.

Mounted, as by welding, between the discharge on opposite side walls 2 and over the center of the discharge plate 3 is a vertical plate member 6.

The discharge plate 3 is mounted at such a distance beneath the walls 2 of the bunker 1 that the material contained in the bunker rests on the plate 3 with its natural slope $t$ which, of course, is peculiar to different materials. The plate 3 is reciprocated about the shaft 5 through an angle $\alpha$ between two end positions I and II on either side of a neutral position O. As shown in the position in FIGURE 1, one of the extreme portions of the plate 3 does not lie within the natural slope $t$ of the material. In the neutral position O, the distance from the edge of the plate 3 to the bottom of the slope line $t$ is equal to at least half the arc length corresponding to the angular displacement.

A shaft 7 is operatively mounted intermittent the frame members 4 to serve as an operating lever, or the like, for the discharging means. A pair of generally parallel conveyors are designated at 8, 8; and, as will be apparent to those skilled in the art, a single belt conveyor 8' may be used to carry away the material which is discharged from the bunker 1. The conveyor 8' is indicated in FIGURE 1 by a dotted line and runs between the frame members 4. In this regard, the distance between pairs of the frame members 4 are larger than the size of the bunker opening in the horizontal plane perpendicular to the direction of the belt conveyor 8'.

The bunker discharging means in FIGURE 1 operates as follows: Assuming the discharge plate 3 to be in the center or neutral position O, the material rests on the plate 3 with the slope $t$. The discharge plate 3 is then moved to the right so that it takes the extreme right position designated by the lines I—I; and the plate is then moved to its extreme left position bounded by the lines II—II, during which movement the material resting on the discharge plate 3 under the bunker opening will be taken along. On this displacement, the layer slope $t$ would assume the position $r$, but as the angle formed by the slope line $r$ of the horizontal plane is larger than the natural slope $t$, the part $a$ of the material bounded by the lines $r$ and $s$ will slip off the end of the discharge plate 3 onto the belt conveyor 8 during this displacement of the layer of material. As is apparent, the line $s$ is generally parallel to the line $t$.

When the discharge plate 3 and the layer of material resting thereon are displaced, the cleared space under the bunker opening is obviously filled up with new material. During the return stroke of the plate 3 (from line II—II to I—I) the new material restrains the part $b$ so that this part also slips over the edge of the plate 3 onto the left-hand belt conveyor 8.

On the right side of the discharge plate 3, the same situation occurs as described above, there being, of course, a difference in phase. Consequently, the material in the bunker 1 falls over each edge of the plate 3 onto the conveyors 8, 8. As the shaft 5 can be fitted in the "silent block," moving parts offer no lubricating problems and, further, the maintenance is at an absolute minimum.

Figure 2:
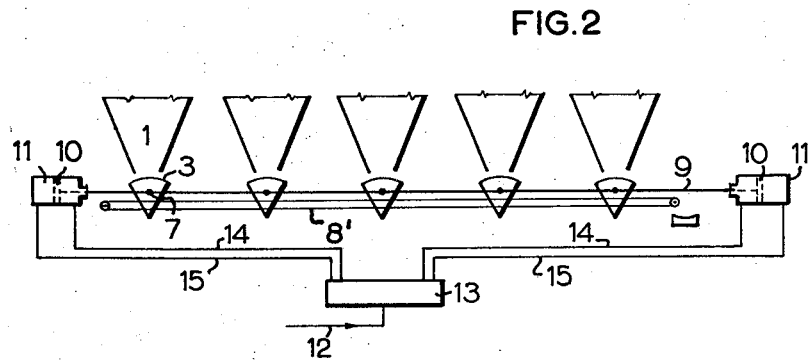
FIGURE 2 is a diagrammatic view of a number of bunkers provided with discharging devices according to the invention.

In FIGURE 2 there is shown diagrammatically a number of juxtaposed bunkers each of which is provided with an operatively mounted discharge plate 3 according to this invention. The discharge device is operatively coupled to a common control rod 9, provided at its ends with pistons 10 each being disposed in a cylinder 11, which is under the influence of pressure medium. The pressure medium is operated from a suitable source (not shown) through a conduit 12, through control valve means 13, through the conduits 14 and 15 and into the cylinders 11. In this regard, the fluid pressure control valve means 13 is known in the art, and forms no part of the present invention.

As indicated in FIGURE 1, the discharge devices fit a number of conveyors 8, which, in turn, can feed a collecting conveyor 8', as desired.

The number and arrangement of the bunkers can be so provided that the contents can thus be conveyed to a preparation plant in a controlled and more uniform manner.

Figure 3:
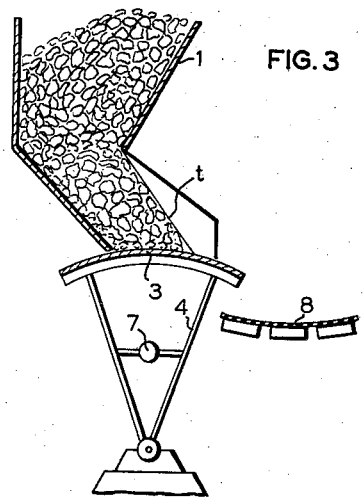
FIGURE 3 is a modification of the discharging means shown in FIGURE 1.

In FIGURE 3 there is shown a modified arrangement of the discharge plate 3 and bunker 1, the bunker 1 of FIGURE 3 is provided with a lateral discharge, the discharge plate 3 operating in a manner generally similar to FIGURE 1, but by virtue of the configuration of the bottom end of the bunker there is provided a discharge onto only one conveyor 8.

Figure 4:
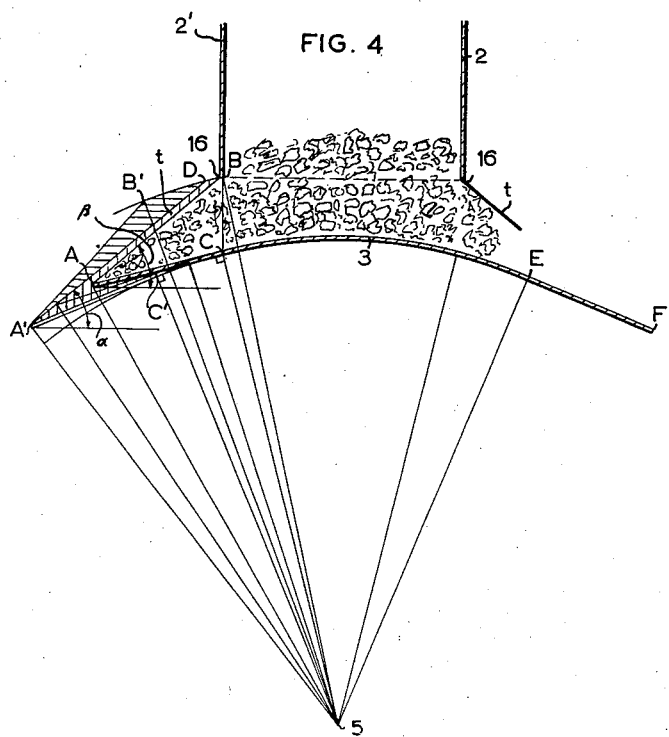
FIGURE 4 is still another embodiment of the discharging means shown in FIGURE 1.

Reference is now made to FIGURE 4 which depicts still another embodiment of the invention shown and described in FIGURE 1. The vertical discharge walls 2 and 2' of the bunker are shown to terminate to their lower edges 16, and the vertical distance between the edge 16 of the upper surface of the discharge plate 3 is designated by the distance BC. The discharge plate 3 in FIGURE 3 is operatively mounted in the same manner as shown in FIGURE 1, and this structure is therefore omitted for clarity.

The discharge plate 3 in this embodiment includes a central cylindrical portion CE wherein the radius $OC=OE$, this radius being equal at all points between the points C and E on the discharge plate 3. Extending outwardly from the points C and E of the central portion CE of the plate 3 are two flat adjoining extensions AC and EF, respectively. These latter extensions being flat, their radius is, of course, infinite. However, the radii of the extensions AC and EF may also gradually increase, the first longer radius of every following portion coinciding with the radius of the preceding portion. As a result, there is a smooth and gradual transformation between these portions. If the radius of the extensions AC and EF is infinite, these extensions are, of course, tangent to the central portion CE of the discharge plate 3.

As shown in FIGURE 4, the discharge plate 3 is in its extreme right-hand position, the point C being perpendicular to a vertical line drawn from the edge 16 of the plate 2 (line CD). From the bottom edge 16 of the plates 2, 2', the material forms a natural slope BA, thereby defining an angle $\beta$ relative to the horizontal plane. As the discharge plate 3 moves to the left, the point A moves to point A', point C to point C', and point B to point B'. As the angle of the natural slope $t$ of the material relative to the horizontal plane remains equal to $\beta$, the slope $t$ takes the position A'—D when the discharge plate 3 is in the extreme left-hand position, so that during the displacement, the material bordered by lines A'—B'—D (shown with horizontal section lines) gradually drops out over the edge of the discharge plate 3. During the return stroke of the discharge plate 3 to the right, the vertically sectioned portion of the material formed by D—A'—C'—C and D—B—A—C (the amount of which is almost equal to the horizontally sectioned portion) also drops down.

On the right side of the bunker discharge opening, the same sequence of discharge occurs, this not being shown in the drawing for clarity.

It is evident that, with the distance between the bunker walls, the height BC and the radius OC being as shown in the drawings, the natural slope BA of the material will not touch cylindrical discharge plate 3 having a radius OC, so that, if a wholly cylindrical discharge plate 3 is provided it would be necessary to appreciably enlarge the radius OC. The bunker would then have to be elevated an increased distance from the floor or the like, where the driving shaft 5 is mounted.

By way of example, notably successful results have been obtained by providing a distance of 1000 mm. between walls 2 and 2' a height BC equal to 300 mm., angle β equal to 40°, and the length of the stroke C, C' equal to 300 mm. It will be noted, of course, that the central portion CE of the discharge plate 3 is displaced exclusively along a cylindrical plane while during the displacement of the extent A'—C' into the position AC, only small amounts of material need be lifted over a relatively short height, and thereby a relatively low dissipation of energy is required.

It will therefore be seen that there has been provided by this invention a discharging device for a bunker in which the various objects hereinabove set forth, together with any practical advantages are successfully achieved.

As various possible embodiments may be made of the mechanical features of this invention without departing from the scope thereof, it is to be understood that all materials hereinabove set forth are shown in the accompanying drawings and are to be interpreted in an illustrative and not in a limiting sense.

What is claimed is:

1. In combination with a discharging device for a bunker or the like having a bottom discharge outlet, a discharge plate mounted below said discharge outlet and operative to support the material in said bunker with its natural slope, said discharge plate having a cylindrical portion with its convex surface facing said outlet, and an extension means extending from at least one end of said cylindrical portion in coincident relation thereto, said extension means being of a greater radius than the radius of said convex surface; shaft means operatively joined to said plate and positioned substantially coincident with the axis of the cylindrical arc thereof; and means operatively connected to said shaft means for oscillating said discharge plate about the axis thereof to discharge material from the bunker, the length of said discharge plate extending beyond the bottom of the natural slope line of material being discharged from the bunker when the central portion of said discharge plate is in a neutral position relative to the discharge outlet, and during oscillation, said plate is operative for movement between opposite vertical planes through the lower discharge outlet of said discharging device, said planes being positioned on opposite sides of a plane of symmetry through said shaft means.

2. Discharging device according to claim 1 wherein said extension means extend from both ends of said discharging plate.

3. Discharging device according to claim 1 wherein said extension means has gradually increasing radii.

4. Discharging device according to claim 1 wherein said extension means has an infinite radius.

References Cited in the file of this patent

UNITED STATES PATENTS

| 232,562 | Sprague | Sept. 21, 1880 |
| 248,879 | Potts | Nov. 1, 1881 |
| 2,447,594 | Petersen | Aug. 24, 1948 |
| 2,577,315 | Ellerbeck | Dec. 4, 1951 |
| 2,692,702 | Church | Oct. 26, 1954 |
| 2,740,561 | Coffman | Apr. 3, 1956 |

FOREIGN PATENTS

| 855,978 | Germany | Nov. 17, 1952 |